(12) United States Patent
Joseph (10) Patent No.: US 8,341,957 B2
(45) Date of Patent: Jan. 1, 2013

(54) PORTABLE WAVE-SWASH AND COASTAL-WIND ENERGY HARVESTER

(76) Inventor: Erat S. Joseph, Baton Rouge, LA (US)

( * ) Notice: Subject to any disclaimer, the term of this patent is extended or adjusted under 35 U.S.C. 154(b) by 18 days.

(21) Appl. No.: 13/068,532

(22) Filed: May 14, 2011

(65) Prior Publication Data

US 2011/0254275 A1   Oct. 20, 2011

Related U.S. Application Data

(63) Continuation-in-part of application No. 12/799,164, filed on Apr. 20, 2010, now Pat. No. 7,963,112.

(51) Int. Cl.
*F03B 17/02* (2006.01)
*F03B 13/18* (2006.01)
*H02P 9/04* (2006.01)

(52) U.S. Cl. ........... 60/506; 60/495; 60/499; 60/502; 290/42; 290/53

(58) Field of Classification Search ........... 60/495–507; 290/42, 43, 53
See application file for complete search history.

(56) References Cited

U.S. PATENT DOCUMENTS

| | | |
|---|---|---|
| 3,687,567 A | 8/1972 | Lininger |
| 3,746,875 A | 7/1973 | Donatelli |
| 4,319,454 A | 3/1982 | Lucia |
| 4,392,060 A | 7/1983 | Ivy |
| 4,447,740 A | 5/1984 | Heck |
| 4,467,218 A | 8/1984 | Andruszkiw et al. |
| 4,661,716 A | 4/1987 | Chu |
| 4,719,754 A | 1/1988 | Nishikawa |
| 4,818,888 A | 4/1989 | Lenoir, III |
| 5,005,357 A | 4/1991 | Fox |
| 5,244,359 A | 9/1993 | Slonim |
| 5,549,445 A | 8/1996 | Schremp |
| 6,109,863 A | 8/2000 | Milliken |
| 6,194,791 B1 * | 2/2001 | Wells .............. 290/53 |
| 6,269,636 B1 | 8/2001 | Hatzilakos |
| 6,559,552 B1 * | 5/2003 | Ha .................. 290/54 |
| 7,327,049 B2 | 2/2008 | Hamburg |
| 7,963,112 B1 * | 6/2011 | Joseph ............ 60/499 |

* cited by examiner

*Primary Examiner* — Kenneth Bomberg
*Assistant Examiner* — Christopher Jetton (57) ABSTRACT

In accordance with the present invention, a portable wave-swash & coastal-wind energy harvester, placed on a sea coast in swash zone captures energy contained in coastal waves and in coastal-wind through the utilization of wave turbines, wind turbines, and wave floats. Wave-float levers carrying wave floats and wave turbines, swing and maintain lower halves of wave turbines below water always. A gear system with one-way clutches transmits torque to an alternator to generate electricity. Flywheels maintain steady rotation of alternator shaft. A buoyancy chamber at the bottom produces reduction of weight of the unit when buoyancy chamber is emptied of water, and thereby enhances maneuverability of unit in water. Stabilization tanks at the top when filled with water provide extra weight and stability of the unit in its operating location. Units linked together in an energy farm combine their energy while forming a seawall-like barrier offering protection against coastal erosion.

18 Claims, 8 Drawing Sheets

PORTABLE WAVE-SWASH AND COASTAL-WIND ENERGY HARVESTER

RELATED APPLICATIONS

The present application is a continuation-in-part application of U.S. patent application Ser. No. 12/799,164, filed Apr. 20, 2010 for PORTABLE WAVE-SWASH & COASTAL-WIND ENERGY HARVESTER, by Erat S. Joseph, included by reference herein and for which benefit of the priority date is hereby claimed.

FIELD OF THE INVENTION

The present invention relates to the simultaneous capturing of the energy contained in sea waves and in wind.

BACKGROUND OF THE INVENTION

Background

The following is a tabulation of some prior art that presently appears relevant U.S. patents

| Pat. No. | Date of Patent | Patentee |
| --- | --- | --- |
| 3,687,567 | Aug. 29, 1972 | William C. Lininger |
| 4,319,454 | Mar. 16, 1982 | Louis V. Lucia |
| 4,392,060 | Jul. 5, 1983 | Jessie T. Ivy |
| 4,719,754 | Jan. 19, 1988 | Kochi Nishikawa |
| 5,005,357 | Apr. 9, 1991 | Mansel F. Fox |
| 5,244,359 | Sep. 14, 1993 | David M. Slonim |
| 5,549,445 | Aug. 27, 1996 | Edward J. Schremp |
| 6,109,863 | Aug. 29, 2000 | Larry D. Milliken |
| 6,269,636 B1 | Aug. 7, 2001 | Constantinos Hatzilakos |
| 6,559,552 B1 | May 6, 2003 | Siu Kwong Ha |
| 7,327,049 B2 | Feb. 5, 2008 | Ron Hamburg |
| 4,447,740 | May 1984 | Heck, Louis J. |
| 4,467,218 | August 1984 | Andruszkiw et al |
| 4,818,888 | April 1989 | Lenoir, III, James L. |
| 4,661,716 | April 1987 | Chu, Chun T. |
| 3,746,875 | July 1973 | Donatelli, Joseph |

Past inventions have utilized essentially the following devices to capture energy from ocean waves and wind: water wheels, wind wheels, and floats. Water wheels and wind wheels are designed to rotate, while floats are designed to move up and down on the water surface. Wave energy can be derived from the up and down motion of deep sea waves or from the flow of water in the wave-swash zone; this invention utilizes the wave energy in the wave-swash combined with the wind energy from coastal-wind.

U.S. Pat. No. 3,687,567, U.S. Pat. No. 4,719,754, U.S. Pat. No. 5,005,357, U.S. Pat. No. 5,244,359, and U.S. Pat. No. 6,109,863 do not utilize the action of wave floats, or the force of wind to extract power.

U.S. Pat. No. 4,319,454, U.S. Pat. No. 4,392,060, U.S. Pat. No. 6,269,636 B1, and U.S. Pat. No. 7,327,049 B2, utilize only floats to extract energy. They do not utilize the action of water wheel or the force of wind to generate power.

U.S. Pat. No. 6,559,552 B1, is designed to capture energy from rain, wind, wave, and solar. It utilizes a water wheel and a wind wheel, but does not utilize action of wave floats for power generation. Floats included in the design are for keeping the apparatus afloat in water, and not for producing power through the movement of floats up and down on water surface. The description states, "The turntable is rotated on bearings over a fixed-horizontal base plate, until the set-up is facing the wind and waves directly to the best advantage." One of the deficiencies of the apparatus is due to the fact that the directions of wind and wave do not necessarily match, and while the horizontal-axis wind wheel will not work unless its orientation changes to face the wind, a water wheel will not work unless it faces water flow.

U.S. Pat. No. 5,549,445 utilizes sea going platforms, wind energy conversion, and subsurface wave energy removing means. It is not designed for operation in the wave-swash zone. It does not utilize the action of wave floats to generate power.

None of the above mentioned patents includes any device to assist in the retention of angular momentum for maintaining sustained rotational energy.

Among nature's energy sources, wind and sea waves are prominent. Despite the fact that abundant energy is available in wind and in sea waves, capturing of this energy economically from these sources remains a technological challenge.

One of the major drawbacks of wind mill technology lies in its very low capacity factor—the ratio of the power actually produced to the power that would have been produced if the turbines operated 100% of the time. Wind stops frequently, and consequently, standard wind mills typically have a capacity factor of only about 35%. Standard wind mills are huge in size, and are economically not feasible. One of the difficulties faced by wave turbine technology is due to the periodic nature of the occurrence of the waves and the resulting variability of torque produced by wave turbines. The present invention addresses these problems.

SUMMARY OF THE INVENTION

In accordance with the present invention, a portable wave-swash & coastal-wind energy harvester, once placed on a sea coast in the wave-swash zone where water washes up on shore, captures the mechanical energy contained in: (a) waves in the swash zone, and (b) coastal-wind. Energy is extracted through: (a) wave turbines, (b) wind turbines, and (c) wave floats. Rotation of the wave turbines is accomplished by the force of waves. Rotation of the wind turbines is achieved by the force of wind. Up and down motion of the wave floats derived from the water level variation during the uprush and backwash of the wave in the swash zone is converted into rotational motion. The torque produced by the wave turbines, the wind turbines, and the wave floats is transmitted to an alternator through a rotational transmission-system that consists of flywheels, axles, large sprockets, small sprockets, roller chains, bevel gears, one-way clutches, and bearings. Gear system with predetermined gear ratios dictates predetermined rpm for an alternator to generate electrical energy. Flywheels attached to the axle linked to alternator shaft enable the maintenance of sustained rpm for the alternator. A buoyancy chamber provided at the bottom can be emptied of water when needed to produce weight reduction of the unit and thus to enhance maneuverability of the apparatus on land and in water. Stabilization tanks at the top, when filled with water, provide added weight, stability, and resistance to overturning and sliding to the unit in its operational location. A group of units linked together and operating on a coast combines their energy while providing a seawall-like protection against coastal erosion.

ADVANTAGES

The apparatus harnesses the energy of waves as well as that of wind simultaneously through the combined utilization of the wave turbines, the wind turbines, and the wave floats, complemented by the flywheels, the buoyancy chamber, the stabilization tank, and other embodiments. Portability of the unit on land, its maneuverability in water, and its stability in the operational location are some of the key features. The wind turbines and the stabilization tanks can be assembled or disassembled at site, a feature which makes it feasible to transport the apparatus to the site in a truck.

The harnessing of energy from waves and wind simultaneously and the utilization of a combination of the wave turbines, the wind turbines, and the wave floats, complemented by the flywheels result in substantially steady rotation of the alternator shaft and a consequent increase of capacity factor to near 100%.

The wind turbines are designed in such a way that they rotate in a specified direction regardless of the direction of the wind.

The flywheels attached to the axle connected to the alternator shaft provide steady angular momentum to the alternator shaft.

The alternator acquires its required rpm from the rotational transmission-system with predetermined gear ratios.

Advantages Continued

The wave-float levers swing about its axles due to the up-and-down motion of the attached wave floats. When the wave-float levers swing, the attached horizontal-axis wave turbines move up and down in such a way that only the lower halves of the wave turbines are maintained below water, thereby extracting optimal amount of wave energy.

Wave-turbine surround covers guide water around the wave turbines to enable optimal extraction of wave energy.

The buoyancy chamber, when emptied of water, enhances the maneuverability of the apparatus in water.

The stabilization tank, when filled with water, serves to increase the weight, stability, and resistance to overturning and sliding of the apparatus once the apparatus is placed in its operational location in the wave-swash zone.

The wind turbines, and the stabilization tanks are detachable, and they can be transported separately to the site and the unit can be assembled at the site.

The apparatus is a self-contained and portable mechanism. Designed with detachable wind turbines and detachable stabilization tanks, the base segment of the apparatus is about the size of a truck, and individual parts can be transported to operational site in a truck, and then assembled at the site.

Advantages Continued

The buoyancy chamber at the bottom produces buoyancy when water is pumped out of it. When the apparatus has to be moved in water, the buoyancy chamber can be emptied.

Once the apparatus is placed in its operating location, it can be secured in place by pumping water into the stabilization tanks located at the top of the unit. The added weight of water in the stabilization tank is utilized for preventing the apparatus from sliding or overturning.

Hydrodynamic calculations of wave energy show that the mechanism is technically feasible from the stand point of the availability of wave energy. Wave power $P=(\rho g^2 T H^2)/(32\pi)$ watts per meter of crest length, where the density of water $\rho=1025$ kg/m$^3$, the acceleration due to gravity g=9.8 m/s$^2$, T=period of wave (s), and H=height of wave (m). As an example, for a wave with height H=1 meter, period T=10 seconds, by the above equation, power P is about 10000 watts or 10 kW per meter of crest length of wave. For a unit, the power available is 25 kW. In an energy farm with several units linked together over a one-mile stretch of coastline, the wave power available is about 15 Mega Watts.

In an energy farm several units are linked together. While each unit operates independently, several units combine their energies to produce substantial quantity of electricity.

Advantages Continued

As an added benefit, there will be reduced coastal erosion where an energy farm is located. The harnessing of the wave energy results in energy dissipation before the wave strikes the shore. Consequently, when several units are operating side by side, they act monolithically like a seawall absorbing energy, thereby reducing littoral drift and coastal erosion. Thus, while producing energy, the energy farm can also ameliorate coastal erosion.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

REFERENCE NUMBERS AND NAMES

Figure 4:
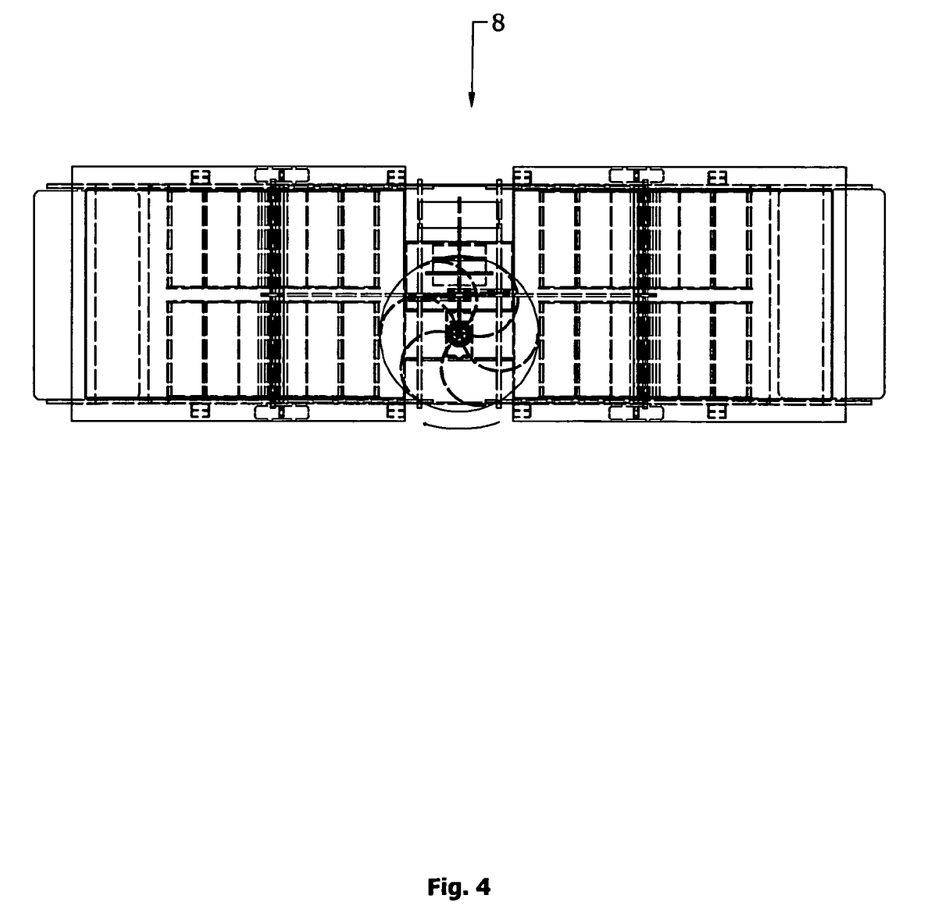
FIG. 4 is a top view of the portable wave-swash & coastal-wind energy harvester invention.
Figure 5:
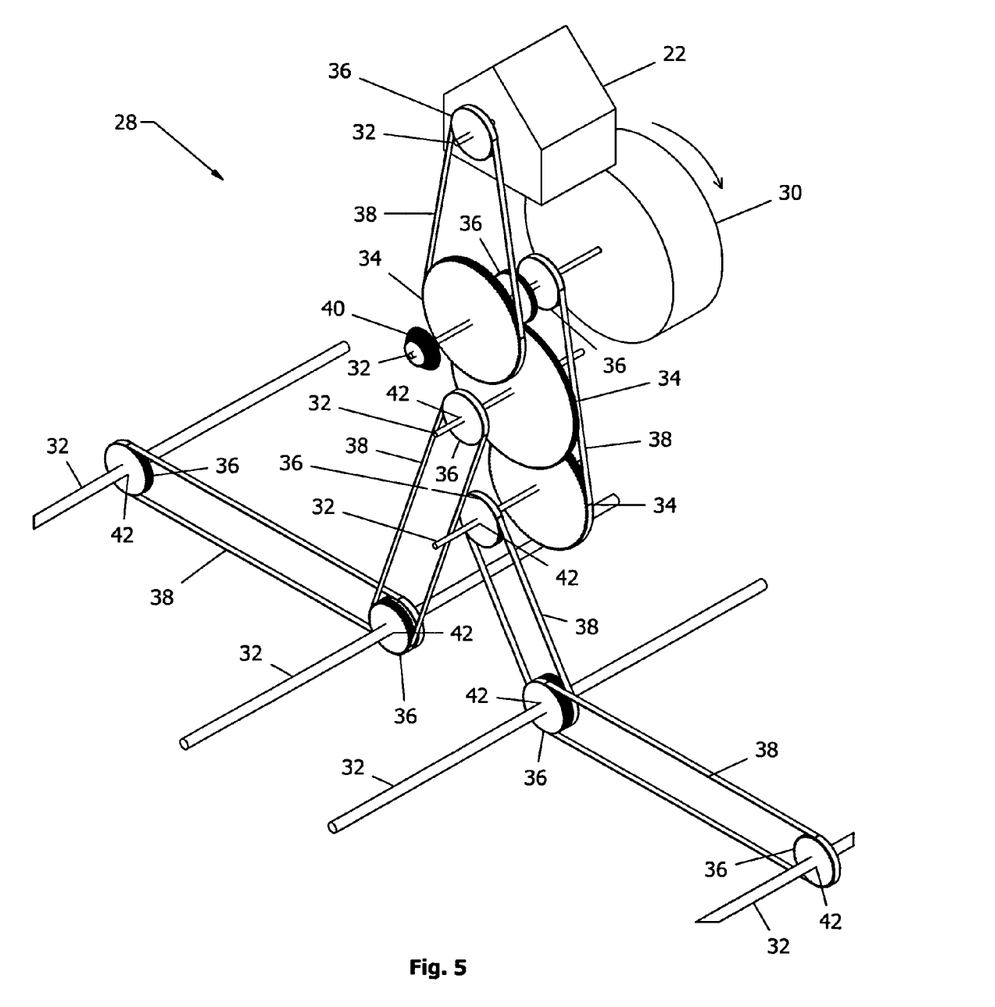
FIG. 5 is an isometric view of the rotational transmission-system of the portable wave-swash & coastal-wind energy harvester invention.

8 energy harvester invention (FIG. 1, FIG. 2, FIG. 3, FIG. 4, FIG. 8)
9 energy farm (FIG. 7)
10 wave turbines (FIG. 2, FIG. 3)
14 wave-turbine surround covers (FIG. 2, FIG. 6)
16 wind turbines (FIG. 2, FIG. 3)
18 wave floats (FIG. 2)
19 wave-float levers (FIG. 2)
20 float restraints (FIG. 2)
22 alternator (FIG. 2, FIG. 3, FIG. 5)
24 buoyancy chamber (FIG. 2, FIG. 3)
26 stabilization tanks (FIG. 2, FIG. 3)
28 rotational transmission-system (FIG. 2, FIG. 3, FIG. 5)
29 transmission-system cover (FIG. 2, FIG. 3)
30 flywheels (FIG. 2, FIG. 3, FIG. 5)
32 axles (FIG. 3, FIG. 5)
34 large sprockets (FIG. 2, FIG. 5)
36 small sprockets (FIG. 5)
38 roller chains (FIG. 5)

Figure 2:
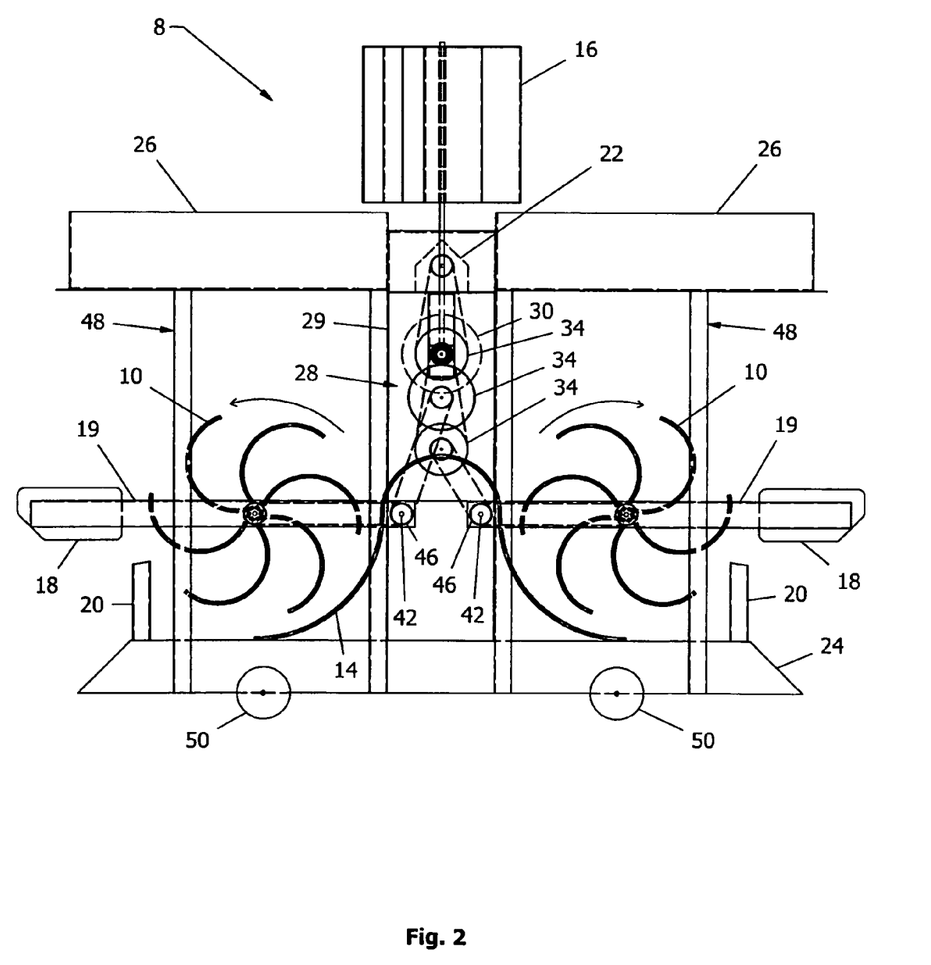
FIG. 2 is a right elevation view of the portable wave-swash & coastal-wind energy harvester invention.
Figure 3:
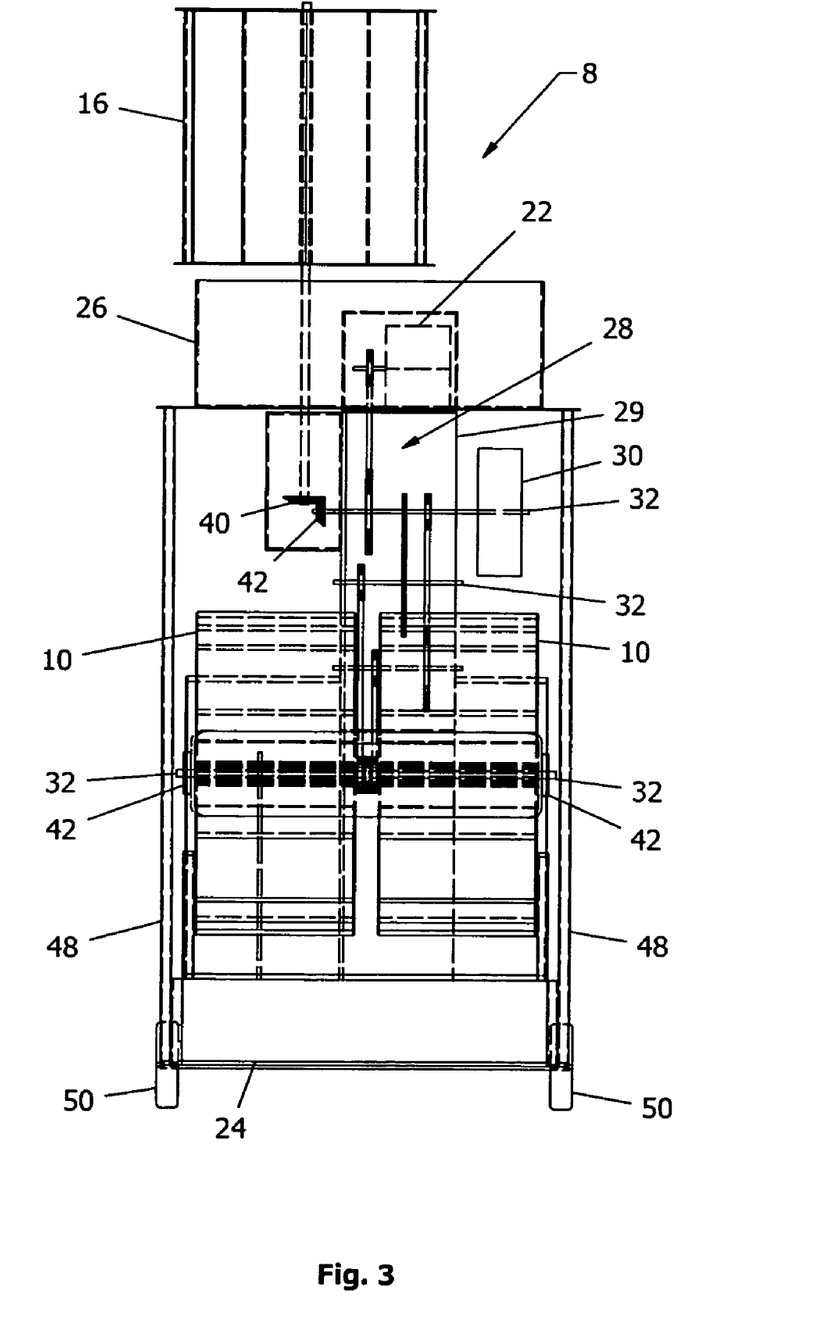
FIG. 3 is a front elevation view of the portable wave-swash & coastal-wind energy harvester invention.

40 bevel gears (FIG. 3, FIG. 5)
42 one-way clutches (FIG. 2, FIG. 3, FIG. 5)
46 bearings (FIG. 2)
48 frame (FIG. 2, FIG. 3)
50 wheels (FIG. 2, FIG. 3)

DESCRIPTION OF THE PREFERRED EMBODIMENT

Figure 1:
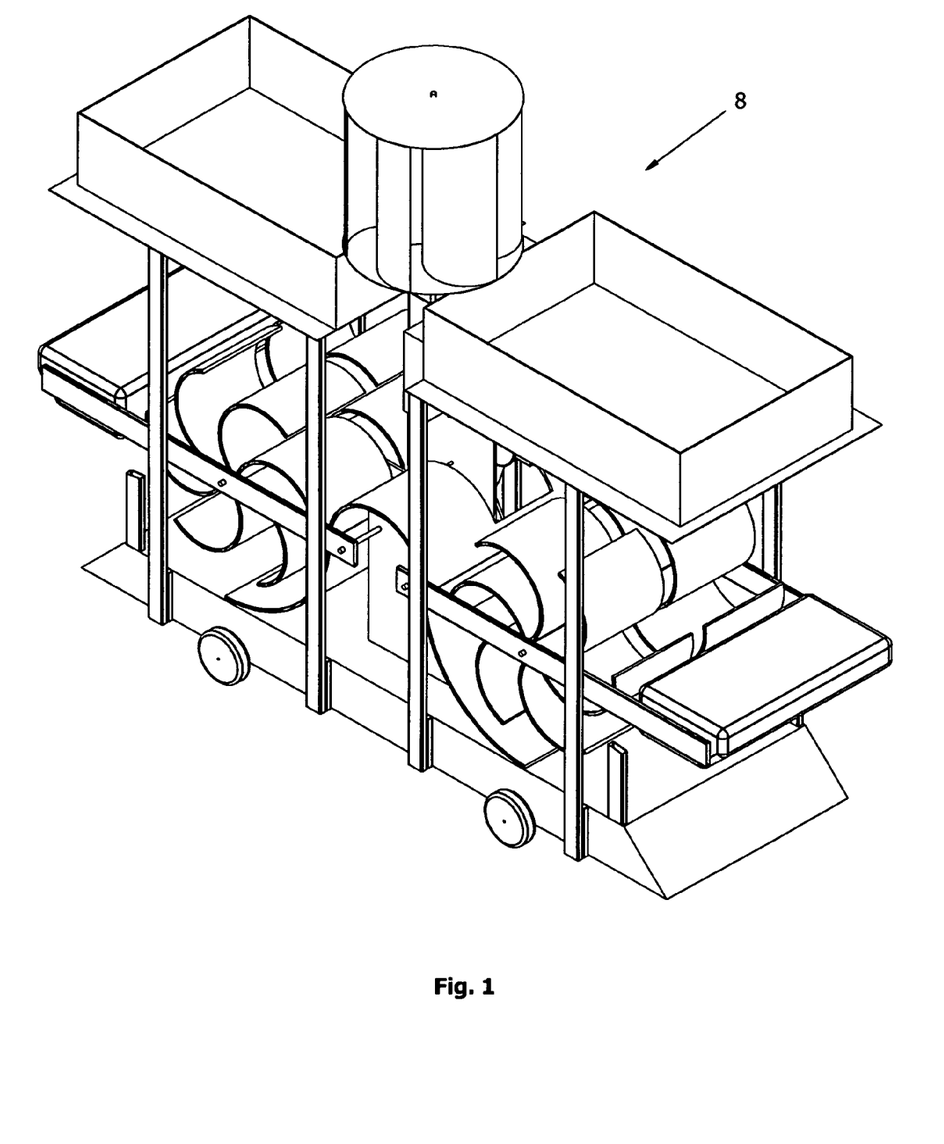
FIG. 1 is an isometric view of the portable wave-swash & coastal-wind energy harvester invention.

FIG. 1 is an isometric front view of the portable wave-swash & coastal-wind energy harvester invention 8.

FIG. 2 is a right elevation view of the portable wave-swash & coastal-wind energy harvester invention 8. Included elements: wave turbines 10, wave-turbine surround covers 14, wind turbines 16, wave floats 18, wave-float levers 19, float restraints 20, alternator 22, buoyancy chamber 24, stabilization tanks 26, rotational transmission-system 28, transmission-system cover 29, flywheels 30, large sprockets 34, one-way clutches 42, bearings 46, frame 48, and wheels 50.

FIG. 3 is a front elevation view of the portable wave-swash & coastal-wind energy harvester invention 8. Included elements: wave turbines 10, wind turbines 16, alternator 22, buoyancy chamber 24, stabilization tanks 26, rotational transmission-system 28, transmission-system cover 29, flywheels 30, axles 32, bevel gears 40, one-way clutches 42, frame 48, and wheels 50.

FIG. 4 is the top view of the portable wave-swash & coastal-wind energy harvester invention 8.

FIG. 5 is an isometric view of the rotational transmission-system 28 of the portable wave-swash & coastal-wind energy harvester invention 8. Included elements: alternator 22, flywheels 30, axles 32, large sprockets 34, small sprockets 36, roller chains 38, bevel gears 40, and one-way clutches 42.

Figure 6:
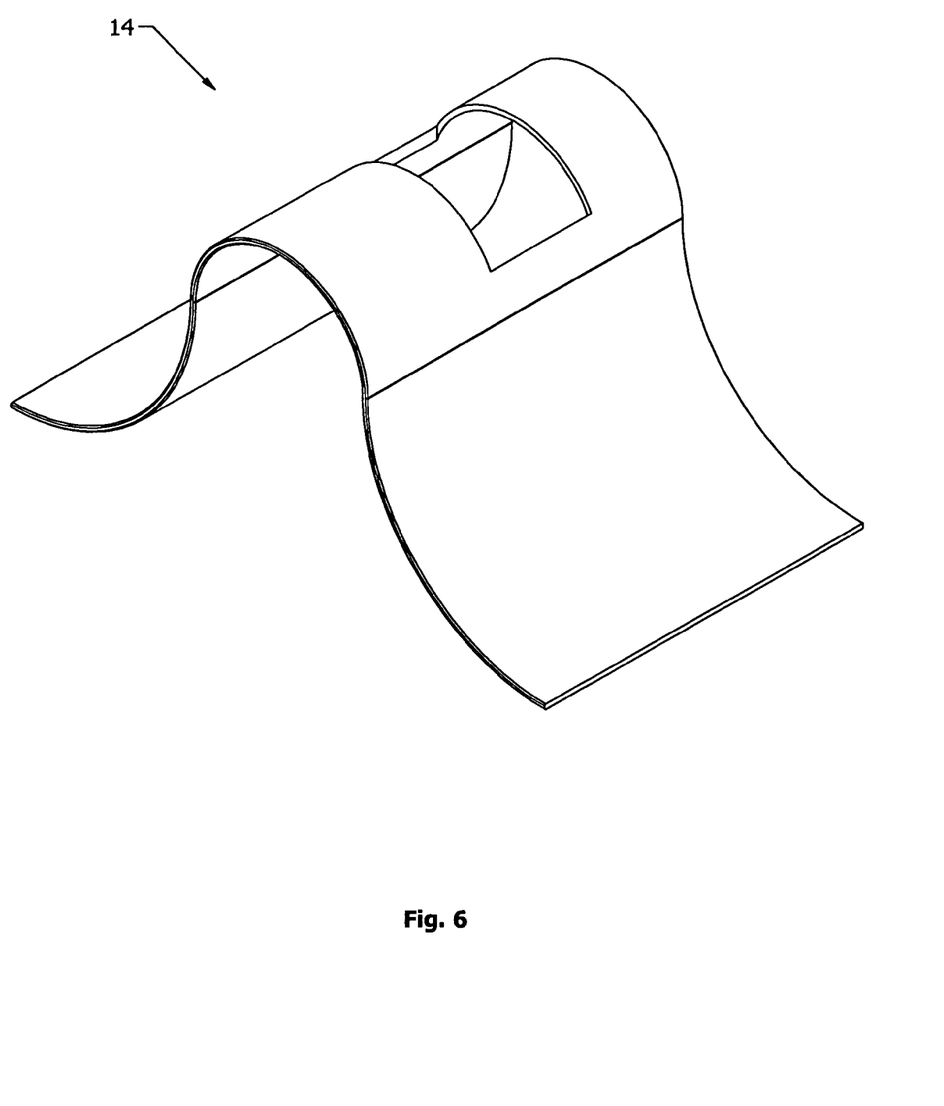
FIG. 6 is an isometric view of wave-turbine surround covers of the portable wave-swash & coastal-wind energy harvester invention.

FIG. 6 is an isometric view of the wave-turbine surround covers 14 of the portable wave-swash & coastal-wind energy harvester invention 8.

Figure 7:
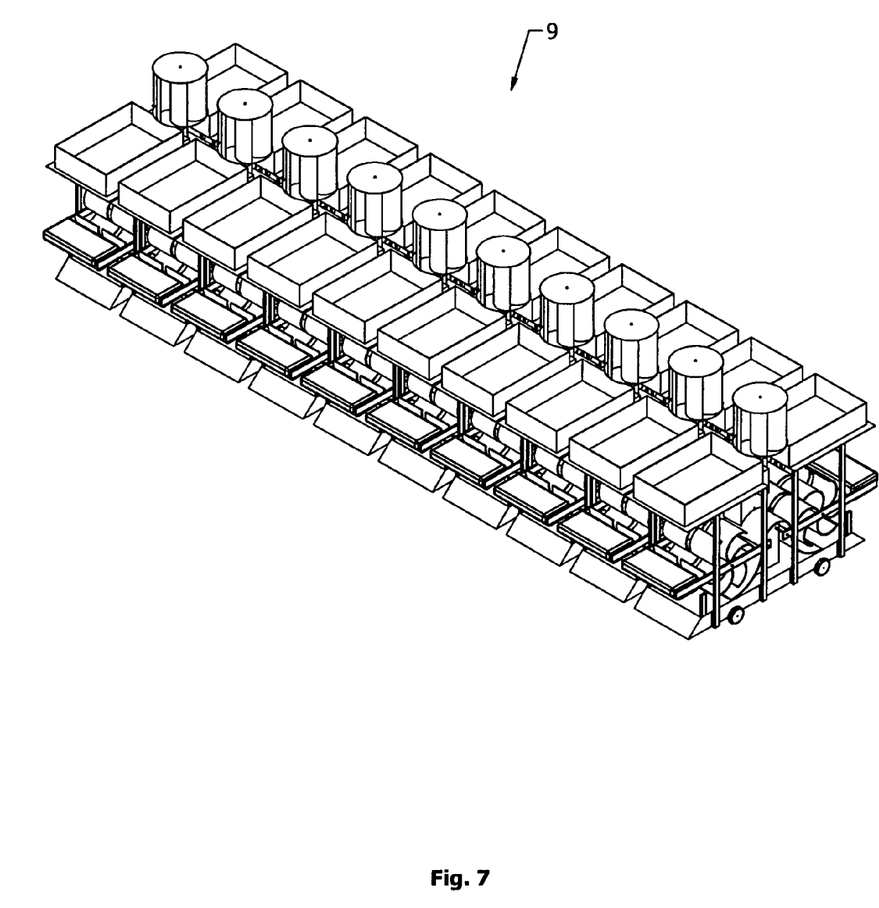
FIG. 7 is an isometric view of the energy farm consisting of a set of units of portable wave-swash & coastal-wind energy harvester invention.

FIG. 7 is an isometric view of the energy farm 9 of the portable wave-swash & coastal-wind energy harvester invention 8.

Figure 8:
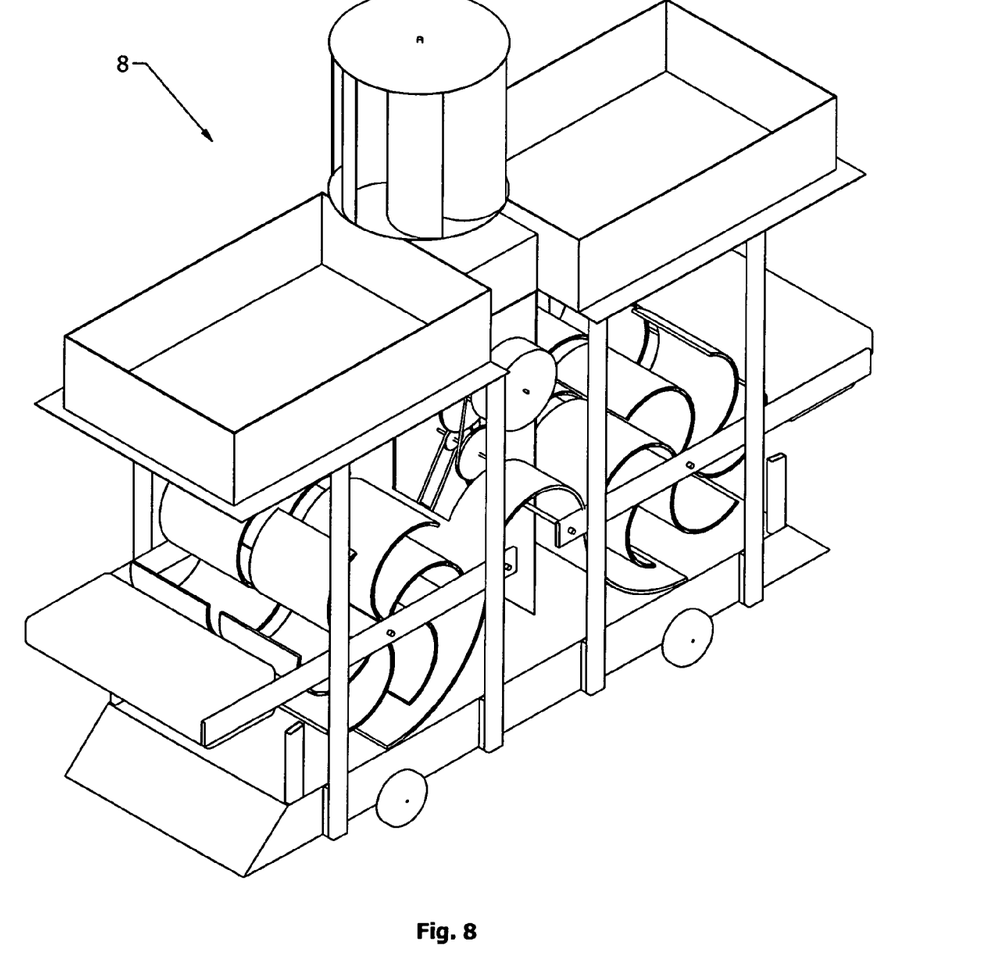
FIG. 8 is a perspective view of the portable wave-swash & coastal-wind energy harvester invention.

FIG. 8 is a perspective view of the portable wave-swash & coastal-wind energy harvester invention 8.

Wave turbines 10 having horizontal axes, with their axles 32 mounted rotatably on wave-float levers 19, are located just above a buoyancy chamber 24.

Wave-turbine surround covers 14, rigidly fitted on frame 48, have curved segments and they wrap around the rear halves of wave turbines 10, leaving predetermined space between wave-turbine surround covers 14 and the outer perimeter of wave turbines 10. Wave-turbine surround covers 14 are located in the space between the wave turbines.

Wind turbines 16, detachably and rotatably mounted on frame 48, have vertical axes and they are located above stabilization tanks 26.

Wave floats 18, rigidly fitted on the far ends of wave-float levers 19, are free to float in the space between the top of the buoyancy chamber 24 and the bottom of stabilization tanks 26.

Wave-float levers 19, pivotally mounted on frame 48, carry wave floats 18 at their far ends away from axles 32, and support wave turbines 10.

Float restraints 20, mounted on frame 48, are located above the top of the buoyancy chamber 24.

Alternator 22, mounted on frame 48, having its shaft is rotatably linked to roller chains 38.

Buoyancy chamber 24, rigidly mounted on frame 48, is a hermetically sealed container located at the bottom of the portable wave-swash & coastal-wind energy harvester 8.

Stabilization tanks 26, detachably mounted on frame 48, are watertight containers, located above the top of wave turbines 10.

Rotational transmission-system 28, mounted on frame 48, comprises flywheels 30, axles 32, large sprockets 34, small sprockets 36, roller chains 38, bevel gears 40, one-way clutches 42, and bearings 46.

Transmission-system cover 29, rigidly mounted on frame 48 envelopes the rotational transmission-system 28.

Flywheels 30, rigidly mounted on axles 32, are heavy circular disks of predetermined weight and diameter.

Axles 32 comprise rotatably supported shafts for large sprockets 34, small sprockets 36, wave-float levers 19, and flywheels 30.

Large sprockets 34, attached to axles 32, are circular in shape and have predetermined diameters.

Small sprockets 36, attached axles 32, are circular in shape and have predetermined diameters.

Roller chains 38, link some large sprockets 34 and to some small sprockets 36, and some small sprockets 36 to some small sprockets 36.

Bevel gears 40, rotatably connected to the axles 32 couple shafts of wind turbines 16 to axles 32.

One-way clutches 42, are attached to axles 32.

Bearings 46, support axles 32.

Frame 48, mounted on wheels 50, is a support structure for all component parts which comprise wave turbines 10, wave-turbine surround covers 14, wind turbines 16, wave floats 18, wave-float levers 19, float restraints 20, alternator 22, buoyancy chamber 24, stabilization tanks 26, rotational transmission-system 28, transmission-system cover 29, flywheels 30, axles 32, bearings 46, and wheels 50.

Wheels 50, attached to the bottom of frame 48.

In Operation,

Wave turbines 10 rotate in predetermined directions about horizontal axes due to force of waves impinging on wave turbines 10. The rotational energy of wave turbines 10 is transmitted to one of the axles 32 of the rotational transmission-system 28.

Wave-turbine surround covers 14 which envelope the rear halves of wave turbines 10 serve as a guide for water coming through wave turbines 10 to flow around wave turbines 10 through the space between the outer periphery of wave turbines 10 and the curved wave-turbine surround covers 14, thereby enabling wave turbines 10 to extract optimal amount of kinetic energy contained in the uprush and back wash in the wave-swash zone.

Wind turbines 16 rotate about vertical axes due to the force of wind blowing on wind turbines 16. By virtue of the curved shape of the blades of the wind turbines, the wind turbines rotate in predetermined directions regardless of the direction of the wind. The rotational energy of wind turbines 16 is transmitted to one of the axles 32 through bevel gears 40 of the rotational transmission-system.

Wave floats 18 move up and down due to the rise and fall of water surface on which wave floats 18 float. The up-and-down motion of wave floats 18 is converted into rotating motion of one of axles 32 of the rotational transmission-system 28.

Wave-float levers 19 having their ends mounted on axles 32 which are held on bearings 46, swing vertically due to the up-and-down motion of the wave floats 18 fitted at the far ends of wave-float levers 19. Swinging wave-float levers 19 which support the wave turbines 10 enable the wave turbines 10 to move up and down in such a way that the axles 32 of the wave turbines 10 are maintained at the water surface, permitting only the lower half of the wave turbines 10 to be under water.

Float restraints 20 confine the movement of wave floats 18 through a predetermined distance in the vertical direction.

Alternator 22 converts mechanical energy into electrical energy. The rotational energy generated by wave turbines 10, wind turbines 16, and wave floats 18 is transmitted to the alternator 22 through the rotational transmission-system 28.

Buoyancy chamber 24 at the bottom can hold water. By pumping water out of it, the weight of a portable wave-swash & coastal-wind energy harvester 8 can be reduced. When the portable wave-swash & coastal-wind energy harvester 8 has to be moved in water, to improve maneuverability, buoyancy chamber 24 can be emptied to reduce the weight of the portable wave-swash & coastal-wind energy harvester 8. On the other hand, once the apparatus is placed in the wave-swash zone for operation, the unit can gain more self-weight and hence more stability by filling buoyancy chamber 24 with water.

Stabilization tanks 26 at the top can hold water. Once the portable wave-swash & coastal-wind energy harvester 8 is placed in its operational location in the wave-swash zone, the weight and stability of the apparatus can be increased by filling stabilization tanks 26 with water. On the other hand, when the apparatus has to be moved out of the operational location, the stabilization tanks 26 can be emptied of water to reduce the weight of the unit and thereby to enhance maneuverability of the unit.

Rotational transmission-system 28 conveys torque generated by the action of wave turbines 10, wind turbines 16, and wave floats 18 to alternator 22.

Transmission-system cover 29, enveloping the rotational transmission-system 28 serves to provide a watertight enclosure for the rotational transmission-system 28.

Flywheels 30 rotate and carry angular momentum derived from the torque generated by the wave turbines 10, wind turbines 16, and wave floats 18 to sustain continuous rotation of one of the axles 32 on which the flywheels 30 are mounted. Flywheels 30 absorb energy and then release energy steadily. The energy released steadily from the flywheels 30 is transmitted to alternator 22.

Axles 32 rotate together with their attached large sprockets 34, small sprockets 36, and flywheels 30.

Large sprockets 34 serve to transmit torque to small sprockets 36 attached to one of axles 32.

Small sprockets 36 receive the torque from large sprockets 34, and covey torque to axles 32.

Predetermined ratios of the diameters of large sprockets 34 to those of small sprockets 36 dictate predetermined revolutions per minute of alternator 22.

Roller chains 38 transmit the torque from large sprockets 34 to small sprockets 36, from small sprockets 36 to small sprockets 36, and from large sprockets 34 to the alternator 22.

Bevel gears 40 connect the vertical shafts of wind turbines 16 to one of the axles 32 thereby causing a change of the direction of the axis of rotation of wind turbines 16.

One-way clutches 42 serve to transmit torque to axles 32 in only one direction toward alternator 22 while suppressing torque in the other direction.

Bearings 46 provide supports for axles 32.

Frame 48 serves as a support structure for the apparatus.

Wheels 50 serve to facilitate rolling of the apparatus on a surface.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. While above description contains many specifications, these should not be considered as limitations on the scope, but rather as an exemplification. Many other variations are possible. For example, the direction of axes and the configuration of wave turbines as well as of wind turbines shown in this example can be altered to optimize performance of the portable wave-swash & coastal-wind energy harvester. Accordingly, the scope should be determined not by the embodiments illustrated, but by the appended claims and their legal equivalents.

Having thus described the invention, what is desired to be protected by Letters Patent is presented in the subsequently appended claims.

Reference Numbers and Reference Names Showing Figure Numbers Where They Appear in Specification

| Ref. # | Reference Name | FIG. 1 | FIG. 2 | FIG. 3 | FIG. 4 | FIG. 5 | FIG. 6 | FIG. 7 | FIG. 8 |
| --- | --- | --- | --- | --- | --- | --- | --- | --- | --- |
| 8 | energy harvester invention | X | X | X | X | | | | X |
| 9 | energy farm | | | | | | | X | |
| 10 | wave turbines | | X | X | | | | | |
| 14 | wave-turbine surround covers | | X | | | | X | | |
| 16 | wind turbines | | X | X | | | | | |
| 18 | wave floats | | X | | | | | | |
| 19 | wave-float levers | | X | | | | | | |
| 20 | float restraints | | X | | | | | | |
| 22 | alternator | | X | X | | X | | | |
| 24 | buoyancy chamber | | X | X | | | | | |
| 26 | stabilization tanks | | X | X | | | | | |
| 28 | rotational transmission-system | | X | X | | X | | | |
| 29 | transmission-system cover | | X | X | | | | | |
| 30 | flywheels | | X | X | | X | | | |
| 32 | axles | | | X | | X | | | |
| 34 | large sprockets | | X | | | X | | | |
| 36 | small sprockets | | | | | X | | | |
| 38 | roller chains | | | | | X | | | |
| 40 | bevel gears | | | X | | X | | | |
| 42 | one-way clutches | | X | X | | X | | | |
| 46 | bearings | | X | | | | | | |
| 48 | frame | | X | X | | | | | |
| 50 | wheels | | X | X | | | | | |

What is claimed is:

1. A portable wave-swash and coastal-wind energy harvester for capturing mechanical energy contained in wave-swash and coastal-wind, comprising:
a frame;
means, rotatably mounted on said frame, for producing rotational energy through reaction to force of impinging waves in said wave-swash;
means, rigidly mounted on said frame, for guiding said wave-swash;
means, rotatably mounted on said frame, for producing rotational energy by reaction to force of wind;
means, movably supported on said frame, for generating energy by producing an up-and-down motion in response to fluctuations of water surface level of said wave-swash, while said water surface level rises and falls with uprush and backwash of said wave-swash;
means, pivotally mounted on said frame, for swinging in response to said fluctuations of said water surface level of said wave-swash, and for transmitting torque produced by said up-and-down motion, and for supporting said wave turbines;
means, housed in said frame, for transmitting rotational energy through the reaction to the force of said wave-swash, rotational energy through the reaction to force of wind, and rotational energy produced from said fluctuations of said water surface level of said wave-swash;
means, mounted on said frame, for providing a watertight enclosure;
means, rotatably mounted on said frame, for retaining angular momentum;
means, rigidly mounted on said frame, comprising at least one airtight bottom-tank that can be emptied of water, for reducing weight and for enhancing maneuverability of said portable wave-swash and coastal-wind energy harvester in water;
means, rigidly mounted on said frame, comprising at least one watertight overhead-tank, that can be filled with water for increasing weight and stability of said portable wave-swash and coastal-wind energy harvester;
means, rotatably fitted on said frame, for enabling said portable wave-swash and coastal-wind energy harvester to roll along a surface.

2. The portable wave-swash and coastal-wind energy harvester in accordance with claim 1, wherein said means for producing rotational energy through the reaction to force of said impinging waves in said wave-swash comprises wave turbines.

3. The portable wave-swash and coastal-wind energy harvester in accordance with claim 2, further comprising curved envelopes around rear parts of said wave turbines for serving as a guide for water coming through said wave turbines to curve around said wave turbines thereby enabling said wave turbines to extract optimal amount of kinetic energy comprises wave-turbine surround covers.

4. The portable wave-swash and coastal-wind energy harvester in accordance with claim 1, wherein said means for producing rotational energy by the reaction to the force of wind comprises wind turbines.

5. The portable wave-swash and coastal-wind energy harvester in accordance with claim 1, wherein said means for generating energy by producing said up-and-down motion in response to said fluctuations of said water surface level of said wave-swash comprises wave floats.

6. The portable wave-swash and coastal-wind energy harvester in accordance with claim 1, wherein said means for supporting said wave turbines and for transmitting torque produced by said up-and-down motion comprises wave-float levers.

7. The portable wave-swash and coastal-wind energy harvester in accordance with claim 1, wherein said means for transmitting rotational energy generated by the action of said wave turbines, of said wind turbines, and of said wave floats to an alternator comprises a rotational transmission-system having axles, large sprockets, small sprockets, roller chains, bevel gears, and one-way clutches.

8. The portable wave-swash and coastal-wind energy harvester in accordance with claim 7, further comprising means for dictating rates of rotation of said axles thereby producing predetermined revolutions per minute for said alternator comprises said large sprockets, said small sprockets, and said roller chains.

9. The portable wave-swash and coastal-wind energy harvester in accordance with claim 7, further comprising means for changing the direction of axes of rotation from those of said wind turbines and of said wave turbines to those of said axles comprises said bevel gears.

10. The portable wave-swash and coastal-wind energy harvester in accordance with claim 7, further comprising means for transmitting torque generated in said axles in only one direction toward said alternator while suspending said torque in the other direction comprises said one-way clutches.

11. The portable wave-swash and coastal-wind energy harvester in accordance with claim 1, comprising means for providing said watertight enclosure for said rotational transmission-system comprises transmission-system cover.

12. The portable wave-swash and coastal-wind energy harvester in accordance with claim 1, wherein said means for retaining said angular momentum transmitted to said alternator comprises flywheels.

13. The portable wave-swash and coastal-wind energy harvester in accordance with claim 1, wherein said means comprising plurality of said airtight bottom-tank that can be emptied of water for reducing weight and for enhancing said maneuverability of said portable wave-swash and coastal-wind energy harvester in water comprises buoyancy chamber.

14. The portable wave-swash and coastal-wind energy harvester in accordance with claim 1, wherein said means comprising plurality of said watertight overhead-tank that can be filled with water for increasing the weight and stability of said portable wave-swash and coastal-wind energy harvester comprises stabilization tanks.

15. The portable wave-swash and coastal-wind energy harvester in accordance with claim 1, wherein said means for enabling said portable wave-swash and coastal-wind energy harvester to roll along a surface comprises wheels.

16. A portable wave-swash and coastal-wind energy harvester for capturing mechanical energy contained in wave-swash and coastal-wind to produce electrical energy in an alternator, and for forming an energy farm on a sea coast, comprising:
a frame;
plurality of wave turbines rotatably mounted on said frame, said wave turbines producing rotation caused by force of waves impinging on said wave turbines, thereby generating energy, each of said wave turbines having a front part and a rear part;
plurality of wind turbines detachably and rotatably mounted on said frame, said wind turbines producing rotation caused by force of wind that blows on said wind turbines, thereby generating energy;
plurality of wave floats, movably supported on said frame, for producing up-and-down motion of said wave floats by floating up and down on surface of water in said wave-swash whose level rises and falls with uprush and backwash of said wave-swash, thereby generating energy;

wave-float levers pivotally mounted on said frame, carrying said wave floats, thereby swinging in response to said up-and-down motion of said wave floats;

said wave-float levers, further carrying said wave turbines, thereby maintaining said wave turbines at said surface of water in said wave-swash such that one half of each of said wave turbines is maintained under water always;

curved wave-turbine surround covers rigidly attached to said frame, for providing an envelope around said rear part of each of said wave turbines to guide water exiting from said wave turbines around said rear part of said wave turbines, thereby enabling said wave turbines to extract optimal amount of kinetic energy;

a rotational transmission-system housed in said frame, comprising a plurality of axles, large sprockets, small sprockets, roller chains, bevel gears, one-way clutches, and bearings, for conveying torque generated by the action of said wave turbines, of said wind turbines, and of said wave floats to said alternator;

said bevel gears rotatably coupled to said axles, for changing the direction of the axes of rotation from that of said wind turbines and of said wave turbines to that of said axles;

said one-way clutches rotatably coupled to said axles, for transmitting said torque in said axles to said alternator in only one direction toward said alternator while suspending said torque in the other direction;

plurality of flywheels rigidly attached to said axles, for retaining angular momentum, thereby maintaining substantially steady rotation of the shaft of said alternator;

at least one buoyancy chamber fitted rigidly at the bottom of said frame, comprising at least one hermetically sealed water tank that can be emptied of water, for reducing the weight of said portable wave-swash and coastal-wind energy harvester by pumping water out of said buoyancy chamber, thereby enhancing maneuverability of said portable wave-swash and coastal-wind energy harvester in water;

a plurality of stabilization tanks detachably mounted on said frame above said wave turbines, comprising at least one watertight overhead tank that can be filled with water, for increasing weight and stability of said portable wave-swash and coastal-wind energy harvester;

wheels rotatably connected to said frame, for enabling said portable wave-swash and coastal-wind energy harvester to roll along a surface.

17. Said energy farm comprising a plurality of said portable wave-swash and coastal-wind energy harvester as recited in claim 16 linked together and arrayed along said sea coast in said wave-swash, thereby combining said electrical energy produced by a group of said portable wave-swash and coastal-wind energy harvester.

18. Said energy farm, recited in claim 17 further forming a seawall-like barrier for acting as an energy dissipater, whereby reducing coastal erosion of said sea coast.

\* \* \* \* \*